(12) United States Patent
Babej et al.

(10) Patent No.: US 7,357,614 B2
(45) Date of Patent: Apr. 15, 2008

(54) FUNCTIONAL ELEMENT FOR ATTACHING TO A SHEET METAL PART COMPOSITE COMPONENT PRODUCED FROM SAID ELEMENT AND METHOD FOR ATTACHING THE FUNCTIONAL ELEMENT TO A SHEET METAL PART

(75) Inventors: Jiri Babej, Lich (DE); Wolfgang Hoessrich, Kronberg (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 0 days.

(21) Appl. No.: 10/510,375

(22) PCT Filed: Apr. 17, 2003

(86) PCT No.: PCT/EP03/04075

§ 371 (c)(1),
(2), (4) Date: Feb. 22, 2005

(87) PCT Pub. No.: WO03/089187

PCT Pub. Date: Oct. 30, 2003

(65) Prior Publication Data

US 2005/0158142 A1    Jul. 21, 2005

(30) Foreign Application Priority Data

Apr. 19, 2002 (WO) ............... PCT/EP02/04365
Oct. 21, 2002 (DE) ................... 102 49 030

(51) Int. Cl.
*F16B 37/06* (2006.01)
(52) U.S. Cl. ...................... 411/181; 411/188
(58) Field of Classification Search .......... 411/179, 411/180, 181, 183, 188
See application file for complete search history.

(56) References Cited

U.S. PATENT DOCUMENTS 3,014,609 A * 12/1961 Hobbs .................. 29/509

(Continued)

FOREIGN PATENT DOCUMENTS

DE          38 35 566 A1    5/1989

(Continued)

*Primary Examiner*—Flemming Saether
(74) *Attorney, Agent, or Firm*—Hunton & Williams LLP; Eugene C. Rzucidlo

(57) ABSTRACT

The invention relates to a functional element for attaching to a sheet metal part, such as for example a nut element or a bolt element comprising a body section or head section, which has a requisite cylindrical part on one axial end and runs into a cylindrical rivet section on its other axial end. Said element is characterised in that the body section is provided with an essentially cone-shaped region between the first axial end or a cylindrical section that may be provided there and the rivet section, said region forming a bearing surface for a corresponding cone-shaped region of a sheet metal part and that the cylindrical part, if present, has a diameter at the border with the cone-shaped region that is no greater than the maximum diameter of said cone-shaped region. When the functional element is attached to the sheet metal part, the narrow end of the cone-shaped region of said metal part is clamped in an annular protrusion, formed by the rivet section. The invention also relates to and discloses a composite component and to a method for attaching a functional element.

9 Claims, 5 Drawing Sheets

U.S. PATENT DOCUMENTS

Figure 1:
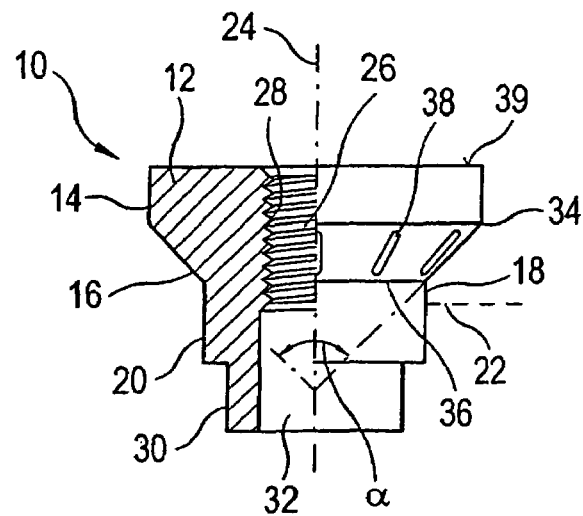

| | | | |
|---|---|---|---|
| 3,117,611 A * | 1/1964 | Matthews | 411/103 |
| 3,255,797 A * | 6/1966 | Attwood | 411/188 |
| 3,276,499 A * | 10/1966 | Reusser | 411/179 |
| 4,459,073 A * | 7/1984 | Muller | 411/176 |
| 4,739,601 A * | 4/1988 | Beine | 52/710 |
| 4,802,803 A * | 2/1989 | Muller | 411/183 |
| 5,006,025 A * | 4/1991 | Duran | 411/183 |
| 5,309,618 A | 5/1994 | Muller | |
| 5,365,654 A * | 11/1994 | Moulton | 29/761 |
| 5,441,417 A * | 8/1995 | Ladouceur et al. | 439/84 |
| 5,445,483 A * | 8/1995 | Fultz | 411/181 |
| 5,489,176 A * | 2/1996 | Fultz | 411/181 |
| 5,564,873 A | 10/1996 | Ladouceur et al. | |
| 5,722,139 A | 3/1998 | Ladouceur et al. | |
| 6,799,929 B2 * | 10/2004 | Oates et al. | 411/121 |
| 6,979,160 B2 * | 12/2005 | Babej et al. | 411/179 |

FOREIGN PATENT DOCUMENTS

| | | |
|---|---|---|
| DE | 42 31 715 C2 | 4/1993 |
| DE | 200 01 103 A1 | 5/2000 |
| DE | 199 09 821 A1 | 9/2000 |
| DE | 101 19 505 A1 | 10/2002 |
| DE | 101 47 076 A1 | 4/2003 |
| EP | 0 540 030 A2 | 5/1993 |
| EP | 0 540 030 B1 | 5/1993 |
| EP | 0 713 892 A2 | 5/1996 |
| EP | 0 922 866 A2 | 6/1999 |
| FR | 2 587 421 A1 | 12/1987 |
| GB | 2 152 862 A | 8/1985 |
| WO | WO 02/086337 A1 | 10/2002 |
| WO | WO 03/029667 A1 | 4/2003 |

* cited by examiner

Schnitt VII - VII

FUNCTIONAL ELEMENT FOR ATTACHING TO A SHEET METAL PART COMPOSITE COMPONENT PRODUCED FROM SAID ELEMENT AND METHOD FOR ATTACHING THE FUNCTIONAL ELEMENT TO A SHEET METAL PART

The present invention relates to a functional element for attachment to a sheet metal part such as for example a nut element or a bolt element having a body part or head part respectively which has at its first axial end, if required, a circularly cylindrical part and which merges at its other axial end into a cylindrical rivet section, in accordance with the preamble of claim 1, and also relates to a component assembly manufactured from the functional element and a sheet metal part.

A functional element of the initially named kind is offered by the company Profil Verbindungstechnik GmbH & Co. KG, Friedrichsdorf, Germany, under the designation EMF in the form of a nut element. With this element a component can be attached to the side of the sheet metal part remote from the ring flange and indeed by means of a threaded bolt which engages into the thread of the nut element and clamps the component and the sheet metal part against one another. The element is attached to a sheet metal part by means of the method which is described in EP-A-0 713 982 in conjunction with its FIGS. 16 and 17, with this method being claimed per se in the corresponding European Divisional Application EP-A-0 922 866. A functional element of the initially named kind in the form of a bolt element is likewise known and indeed in the form of a so-called SBF bolt element of the company Profil Verbindungstechnik GmbH & Co. KT which is described, amongst other things, in the German Patent 34 47 006 together the associated attachment method. Both the EMF element and also the SBF element have proved themselves in practise. With the EMF element the sheet metal part is only insignificantly deformed and remains, in the region of attachment of the functional element, at least substantially in the same plane as the surrounding sheet metal material.

In contrast, with the SBF bolt, a rounded recess is produced in the sheet metal part and this leads to a relatively stiff attachment of the bolt element to the sheet metal part.

The object underlying the present invention is to provide a functional element which ensures a stiff attachment to the sheet metal part, so that tensile forces and compression forces and also transverse forces and shear forces can be transmitted via the element to the sheet metal part, with the attachment being intended to have a long working life even with alternating loading and not tending to the formation of fatigue cracks. Furthermore, the invention intends to provide a component assembly comprising the functional element and a sheet metal part which has corresponding characteristics and to make available a method for the attachment of the functional element which ensures a high quality attachment of the functional element to the sheet metal part without being particularly complicated in its realization. In addition, the functional element should be suitable for an electric terminal element, for example in the form of an earthing bolt.

In this application the designation "functional element" has its normal meaning, the examples for such functional elements are fastener elements such as nut elements and bolt elements which enable the attachment of a further component to a sheet metal part. The designation however also includes all other types of hollow elements which for example serve to receive inserted parts or as a rotatable support for a shaft as well as all elements which are provided with a shaft part, for example to receive a clip or for the rotary mounting of a hollow part.

In order to satisfy the object a functional element of the initially named kind is provided in accordance with the invention which is characterized in that the body part is provided in the region between the first axial end, or any circularly cylindrically part provided there, and the rivet section with an at least substantially conical region which forms a contact surface for a corresponding conical region of a sheet metal part and in that the circularly cylindrical part, if present, has a diameter at the boundary to the conical region which is not larger than the maximum diameter of the conical region and thus does not form a ring flange there.

A corresponding component assembly is characterized in that the body part is provided in the region between the first axial end, or any circularly cylindrically part provided there, and the rivet section with an at least substantially conical region which forms a contact surface for a corresponding conical region of the sheet metal part and in that the circularly cylindrical part, if present, has a diameter at the boundary to the conical region which is not larger than the maximum diameter of the conical region and thus does not form a ring flange there, wherein a conical region of the sheet metal part is trapped in a ring bead formed from the rivet section and in that the conical region of the sheet metal part contacts the conical region of the functional element at least substantially over its full area.

This embodiment of the functional element, or of the component assembly formed with the functional element, thus leads to a formation in which the conical region of the sheet metal part contacts the conical region of the body part of the functional element at least substantially over its full area. This construction provides a particularly stiff and firm attachment of the functional element of the sheet metal part and thus satisfies the subject of the object set out above.

This full area contact leads to a situation in which relative movements between the sheet metal part and the element are largely precluded. This also increases the stiffness of the connection and helps avoid the formation of fatigue cracks.

It is particularly favourable when features providing security against rotation are provided in the region of the conical surface since the sheet metal material can be brought into engagement with these features providing security against rotation, whereby the security against rotation is achieved without reducing the stiffness of the connection. The features providing security against rotation can, for example, advantageously have the form of noses and/or recesses.

The axial length of the conical surface should correspond at least approximately to twice the sheet metal thickness, preferably to approximately four times the sheet metal thickness. A dimension of this kind ensures that the conical region is adequately long in order to achieve the desired stiffness.

The enclosed cone angle of the conical surface preferably lies in the range between 60° and 150°. An enclosed cone angle in the range between 70° and 140° and in particular a cone angle of 75° to 150° is particularly preferred. An enclosed cone angle of approximately 90° counts as particularly preferred.

It is particularly favourable when the conical surface merges via a cylindrical neck part into the rivet section. This neck part is essentially not deformed during the deformation of the material of the functional element in the region of the rivet section and forms a part of the clamping recess for the sheet metal material in the region of the edge of the hole provided in the sheet metal material. The neck part can, with advantage, have an axial length which corresponds approximately to the sheet metal thickness and is preferably somewhat larger than this.

The axial height of the circularly cylindrical part can be reduced to zero so that the end face of the conical region with the largest diameter comes to lie at the surface of the sheet metal part remote from the rivet bead or lies somewhat higher or lower than this surface.

The possibility also exists however of making the axial thickness of the circular cylindrical part significantly larger than the thickness of the sheet metal part to which the element is to be secured. In this case the end face of the circularly cylindrical part remote from the sheet metal part projects significantly in front of the corresponding top side of the sheet metal part and can for example be exploited to realize a spacer function. In both cases the conical surface in the region of the side of the sheet metal part remote from the rivet bead can be executed with a relatively large diameter so that on the whole a large support surface is present between the functional element and the sheet metal part, whereby a favourable surface pressure is achieved and the transmission of forces via the functional element into the sheet metal part can be favoured. Particularly preferred embodiments of the functional element and also of the component assembly can be found in the subordinate claims.

The attachment of the functional element to a sheet metal part can take place amongst other things with a method which is essentially known from the German Patent 34 47 006, with the shape of the die being adapted to the special shape of the sheet metal part of the functional element.

Figure 2:
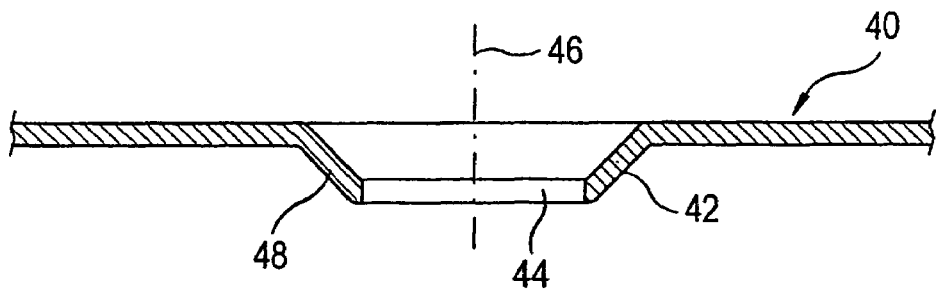
Figure 3:
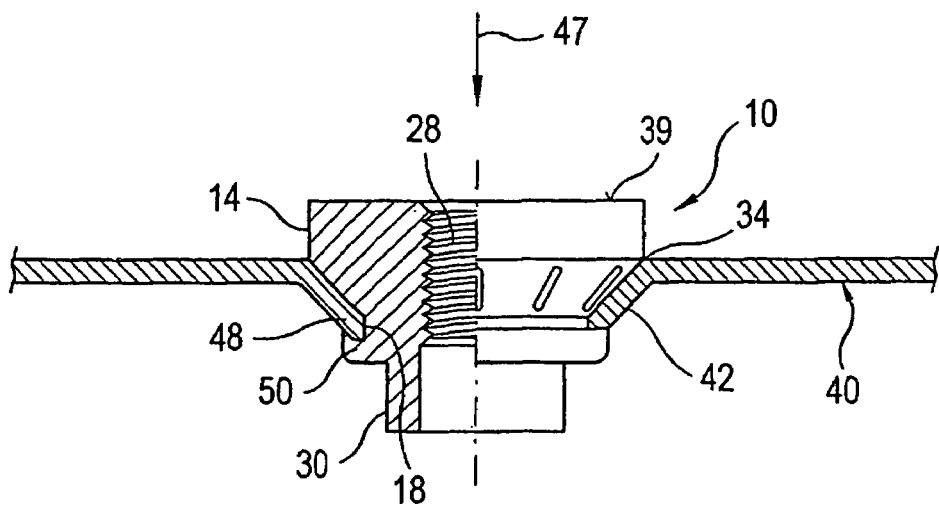
Figure 4:
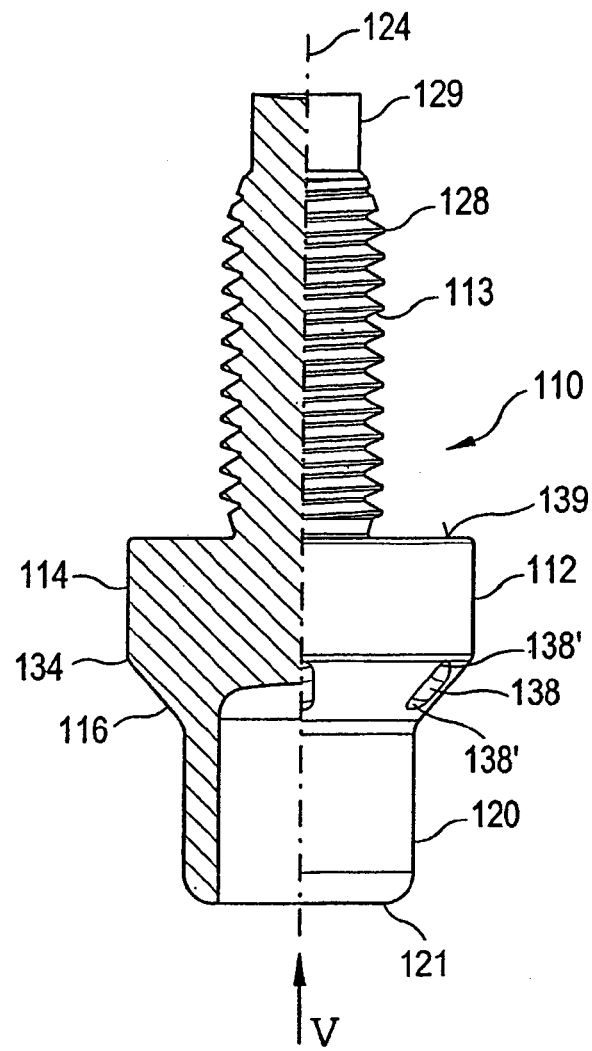
Figure 5:
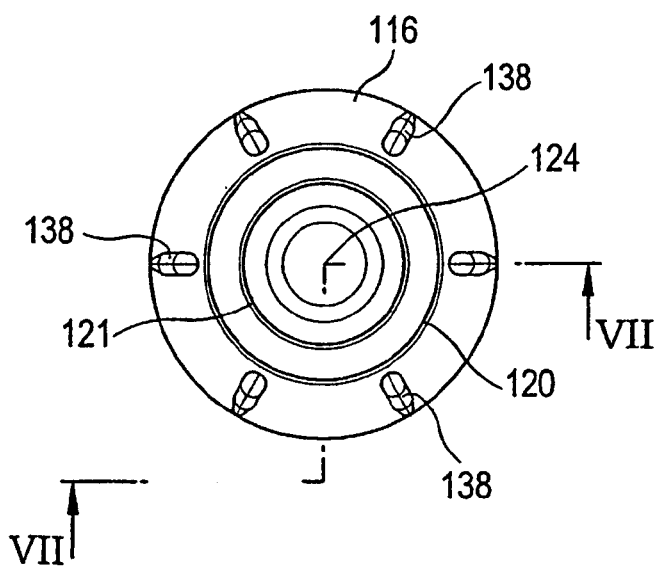
Figure 6:
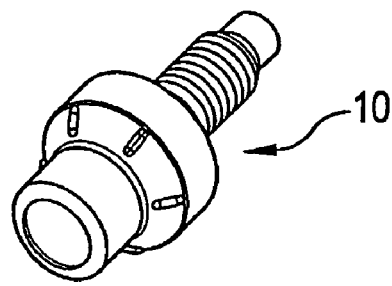
Figure 7:
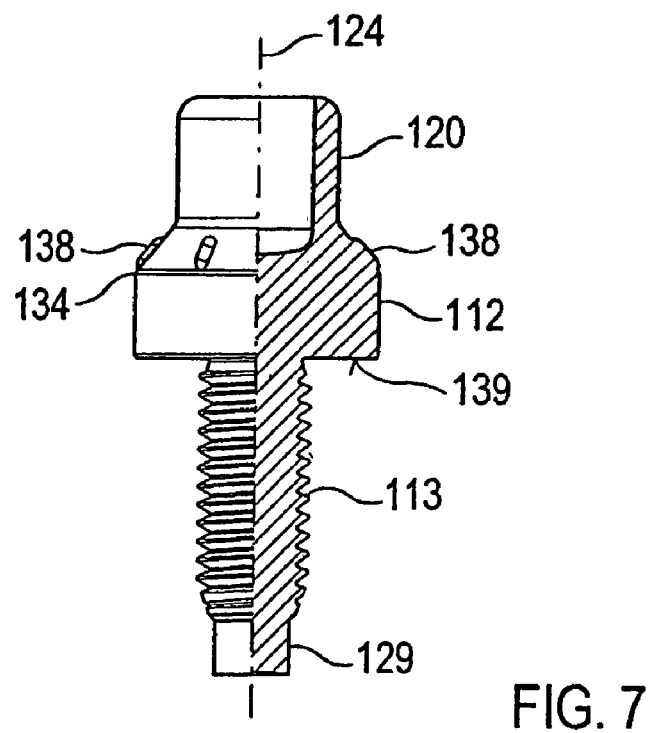
Figure 8:
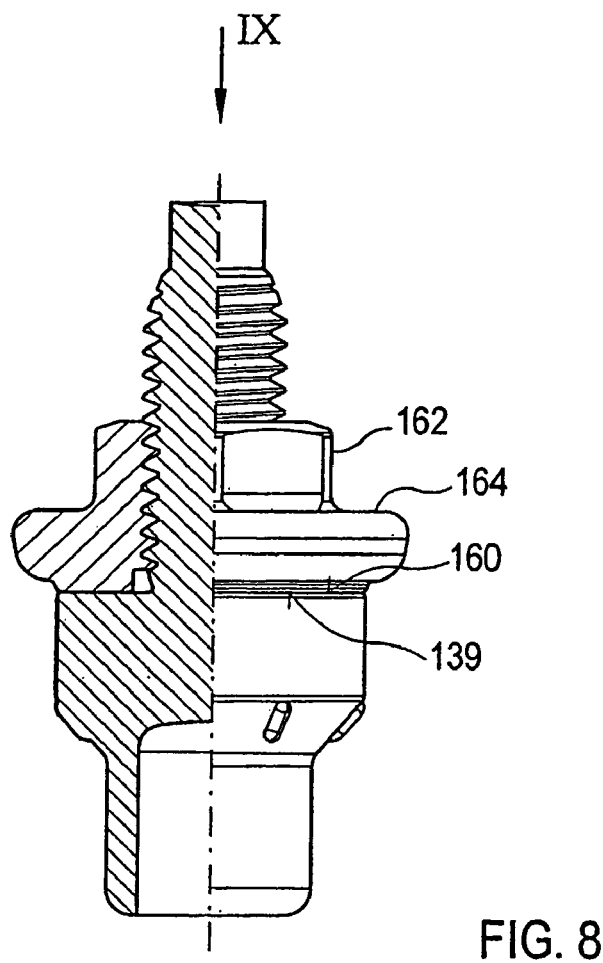
Figure 9:
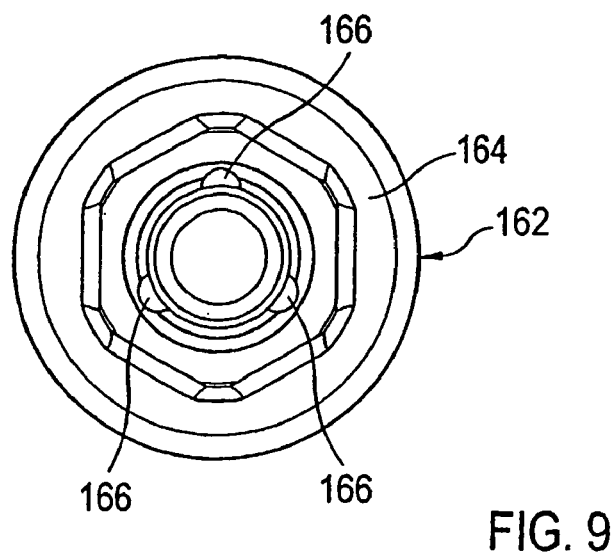
Figure 10:
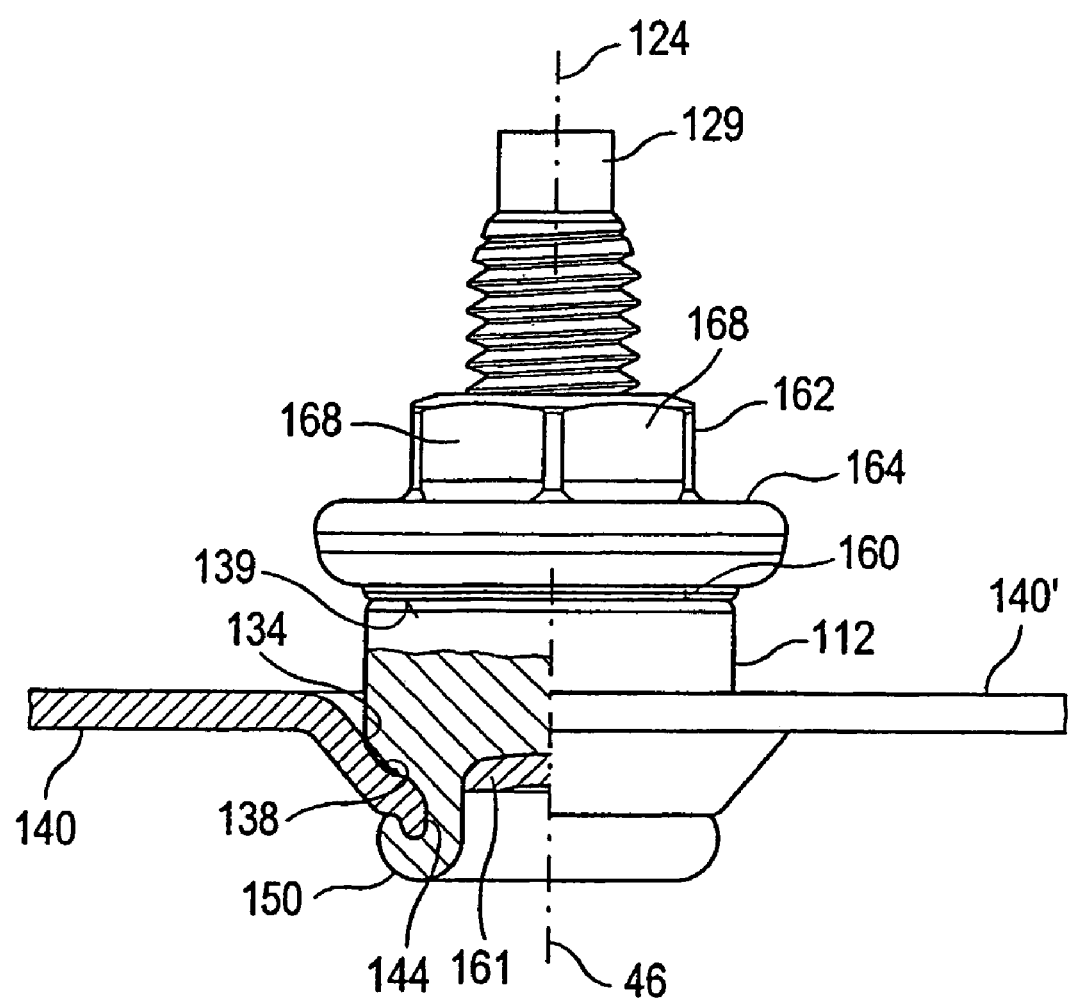

The invention will be explained in more detail in the following with reference to embodiments and to the drawings which show:

FIG. 1 a functional element in the form of a nut element partly sectioned in the axial direction, FIG. 2 a schematic representation of a sheet metal part which is prepared to receive the functional element of FIG. 1, FIG. 3 a component assembly which is formed from the functional element of FIG. 1 and the sheet metal part of FIG. 2, FIG. 4 a side view of a functional element in the form of a bolt element partly sectioned in the longitudinal direction, FIG. 5 an end view of the bolt element of FIG. 4 corresponding to the arrow direction V of FIG. 4, FIG. 6 a perspective representation of the bolt element of FIGS. 4 and 5, FIG. 7 a drawing similar to FIG. 6 of the same subject but to a different scale and with a section plane which extends through a nose providing security against rotation, FIG. 8 a representation of the bolt element of FIGS. 4 to 7 in the view of FIG. 7 but with a nut element screwed onto the shaft part 128, in particular for the formation of an electrical connection bolt, FIG. 9 an end view of the bolt and nut combination of FIG. 8 seen in the arrow direction I of FIG. 8, and FIG. 10 a partly sectioned representation of a component assembly which is formed from the bolt element of FIG. 8 and a sheet metal part.

FIG. 1 shows a functional element 10 having a one-piece body part 12 which has no ring flange but rather a conical surface 16 which merges without a ring flange into a circularly cylindrical part 14 the diameter of which corresponds at least substantially to the maximum diameter of the conical surface 16. Rounded transitions, which are technically caused by the cold heading process, can result in the region of the boundary between the conical surface 16 and the circularly cylindrical part 14 and also at the transition from the circular cylindrical part 14 and its free end face 39. Furthermore, the functional element 10 that is shown has a neck part 18 which merges into a rivet section 20. The boundary between the neck part 18 and the rivet section 20 lies at 22. The body 16 of the functional element 10 has moreover a bore 26 with a threaded cylinder 28 arranged concentrically to the longitudinal axis 24. At the lower end of the rivet section 20 in FIG. 1 the rivet section passes into a cylindrical projection 30 which can be regarded as belonging to the rivet section 20. The bore 28 of the nut element 10 has, in the region of the cylindrical projection 30, a region 32 with a diameter which is slightly larger than the base diameter of the thread cylinder 28.

The conical surface 16 extends specifically between the boundary to the circular cylindrical part 14 of the functional element up to the boundary 36 to the neck part 18 and has a cone angle α of 90° in this embodiment. It should be emphasized that the circular cylindrical part can in principle have any desired length in the axial direction 24 and the circular cylindrical part can also be missing completely so that the end face 39 of the functional element lies at the position of the maximum diameter of the conical surface 16, i.e. at 34 in FIGS. 1 and 3.

The circular cylindrical part 14 can also have a diameter which is significantly smaller than the maximum diameter of the conical surface 16 so that a step is present at the boundary 34 in FIGS. 1 and 3. The part 14 could also be formed as a part which tapers away from the boundary 34 in the direction away from the conical surface 16.

The circular cylindrical part could, if desired, have a different peripheral shape. For example it could have a polygonal or grooved shape in plan view or be made conically divergent or tapering or stepped. It is important that it does not have any dimension at the boundary surface to the conical region which is larger than the largest diameter of the conical region and thus does not form a ring flange there. When it is made conically divergent the enclosed cone angle must be smaller than that of the conical region and irrespective of what shape it has, no extending region may be supported at the sheet metal part and serve as a flange part. At most a few corners may be omitted to dig into the sheet metal part and serve as a security against rotation, but with a design of this kind being, if anything, undesired. These statements are to be taken into account in the interpretation of the term "circular cylindrical part", i.e. this term is to be interpreted accordingly.

Features 38 providing security against rotation are uniformly distributed around the conical surface and here have the form of noses which respectively extend in axial planes of the element. Eight such noses 38 providing security against rotation are provided here, it could however be more or fewer. The noses providing security against rotation could also have the form of recesses or noses providing security against rotation and recesses providing security against rotation could be provided, for example alternately around the conical surface.

FIG. 2 shows a sheet metal part 40 which has been prepared to receive the functional element 10 of FIG. 1. Specifically the sheet metal part 40 has a conical recess 42 with a hole 44 in the base region of the conical recess. The cone angle of the conical region 42 of the sheet metal part 40 corresponds preferably to the cone angle α of the conical surface 16 of the functional element 10. The hole 44 has a diameter which corresponds to the diameter of the neck part 18 of the functional element 10 of FIG. 1. The hole 44 could also have a larger diameter, for example in the range of 0.2 mm larger in order to enable easier introduction of the functional element into the hole. It would also be conceivable to make the hole 44 fractionally smaller than the diameter of the neck part 18 whereby the hole 44 will be slightly dilated on introduction of the neck part 18 through the hole 44. The conical shape of the recess 42 facilitates in any event the alignment of the functional element 10 with the sheet metal part on the introduction of the functional element. The axis 46 of the hole 44 is thereby aligned with the longitudinal axis 24 of the functional element 10.

The sheet metal preparation normally takes place in a press or in a station of a progressive tool. In a further press (or in the same press) or in a further station of a progressive tool the functional element 10 is then introduced into the sheet metal part 40 using a setting head and attached to it, with the component assembly which results being shown in FIG. 3 and being explained in more detail in the following. It should briefly be emphasized that the attachment of functional elements to sheet metal parts in presses and in progressive tools or using robots or special frame devices is well known per se and will not be explained here in detail.

The component assembly situation in accordance with FIG. 3 allows it to be seen that a ring bead 50 is formed from the rivet section 20 of the functional element by displacement of material of the rivet section in the direction towards the ring flange 14. This ring bead 50 forms, together with the neck part 18 which is only slightly deformed on displacement of the material of the rivet section for the formation of the ring bead 50, a clamping recess for the edge region 48 of the hole 44 of the sheet metal part 40 and serves for a corresponding press-out resistance in the opposite direction to the arrow direction 47 in FIG. 3. The conical region of the sheet metal part 40 adjacent to the conical surface 16 takes care of a corresponding pressing resistance. Although not shown here the displacement of the material of the rivet section in the direction towards the ring flange 14 takes place in a die which has a conical recess which enters into contact against the outer side of the conical region 42 of the sheet metal part, so that the sheet metal material is simultaneously pressed radially inwardly whereby a form-fitted engagement arises between the sheet metal material in the conical region 42 and the features 38 providing security against rotation.

On displacement of the material from the region of the rivet section towards the ring flange pressure is exerted from above in the arrow direction 47 onto the end face 39 of the functional element 10. Since relatively much material is present in the body part 12 of the functional element between the end face 39 and the rivet section this region of the functional element is not deformed so that a deformation of the thread cylinder 28 need not be feared. The cylindrical continuation 30 of the rivet section is not deformed during the attachment of the functional element but rather only guided in a bore of the (not shown) die. During the attachment of the functional element of the sheet metal part a ring-like hold-down member can be used at the setting head which is arranged around the cylindrical part 14 and which presses the sheet metal part adjacent to the conical recess 42 against a planar ring surface at the end face of the die that is used, with this ring surface extending parallel to the sheet metal part 40 in the region around the conical recess 42. It is also possible to operate without a hold-down member or, if present, to receive the circularly cylindrical part 14 in a recess at the free end of a plunger of a setting head, so that the end face of the plunger lies flush with the side of the sheet metal part remote from the rivet bead after the pressing in of the functional element and thus functions as a hold-down member or presses the sheet metal part flat around the conical recess.

The component assembly in accordance with FIG. 3 has amongst other things the advantage that a further component can be attached to the one or other side. For example a component can be secured to the end face 39, in this case by means of a bolt which, coming from above in FIG. 3, is screwed into the thread cylinder 28. Through the conical design of the region 42 of the sheet metal part and the design of the ring bead 50 the attachment of the functional element to the sheet metal part is so firm, i.e. stiff, that the attachment of a component to this end face 39 is straight forwardly permissible. In this connection the height of the circular cylindrical part 14, i.e. the axial thickness of this part can be selected in order to ensure a spacer function between the further component and the sheet metal part 40. If the conical part is omitted, then the end face 39 can lie flush with the upper side of the sheet metal part 40 or higher or lower than this.

The possibility also exists of attachment a component to the lower side of the sheet metal part 40 in FIG. 3. In this case the bolt would be introduced from below into the thread cylinder 28. The component could be supported at the lower side of the sheet metal part opposite to the conical part 16 of the functional element 10 or at the lower side of the ring bead 50 or, with suitable dimensioning of the cylindrical projection 30 at the free end face of this projection. The cylindrical projection 30 could also serve as a bearing surface for a rotatable part which is likewise secured with a bolt which is introduced into the thread cylinder 28 coming from below.

The FIGS. 4 to 10 show a further example of a functional element in accordance with the invention here in the form of a bolt element.

In the following description the same reference numerals will be used for parts which have the same shape or function as in the nut element of FIGS. 1 to 3, but increased with the base number 100. It can be assumed that the previous description also applies for the correspondingly numbered parts of the embodiment of FIGS. 4 to 9, unless something is stated to the contrary.

The bolt element 110 has a head part or body part 112 which corresponds at least substantially to the body part 12 of the nut element of FIG. 1 and the bolt element has moreover a shaft part 113 which extends away from the top side 139 of the circular cylindrical part 114. The shaft part 113 carries a thread cylinder 128 and ends in a guide spigot 129, for example in accordance with EN ISO 4753.

The circular cylindrical part 114 merges in this example via a ring-like transition 134 into a conical contact surface 116 which directly merges into a rivet section 120 which is equipped here at its lower end 121 with piercing and riveting features which can in principle be identical to the piercing and riveting features of the customary SBF bolt, which however preferably has the form in the German patent application 101470076.2. I.e., one can imagine the bolt element in accordance with FIGS. 4 to 7 in such a way that now no neck part is provided, which is basically also possible in the embodiment of the functional element in accordance with FIGS. 1 to 3. On the other hand, the upper region 118 of the pierce and rivet section 120 is here at least substantially not deformed, as can be seen from FIG. 7, so that this region could, optionally, be termed a neck part.

In similar manner to the embodiment of FIGS. 1 to 3 features 138 providing security against rotation are provided here which here have the form of noses. It would also be possible to replace the noses 138 providing security against rotation in accordance with FIGS. 4 to 10 with recesses providing security against rotation which could have the same shape as the noses that are shown but which present themselves as recesses in the conical surface 116 instead of raised portions.

One notes from FIG. 10 that the upper end face 139 of the head part 112 of the bolt element lies significantly proud of the plane of the top side 140' of the sheet metal part 140.

This is in particular of advantage when, as here, the functional element is intended as an earthing bolt, with one or more eyes or forks of current transmitting cables being clamped between the lower end face 160 of the nut 162 in FIG. 10 and the end face 139 (not shown).

It is a special feature of the earthing bolt of FIGS. 4 to 10 that it is introduced into the sheet metal part in self-piercing manner with the nut 162 screwed on, using the method which is described in the above-mentioned patent specification 34 47 006, with the plunger of the setting head pressing against the ring surface 164 of the nut element. The nut element is screwed onto the bolt element and tightened before its attachment so that on subsequent painting of the component assembly consisting of the sheet metal part 140 and the bolt/nut combination 110, 162, or during the application of another protective coating, the paint or the protective coating does not contaminate the thread in the region between the nut element and the bolt element and thus cannot lead to an increased electrical resistance in this region. The spanner to tighten the nut element 162 engages at the tool engagement flanks 168.

Furthermore, the outer diameter of the end face 160 of the nut element 162 is made fractionally larger than the end face 139 of the bolt element. In this way it is ensured that no paint or other protective coating can contaminate the end face 139, so that on attachment of a cable shoe the latter always lies in close contact with this end face an a high quality electrical contact is present here. If the diameter of the end face 160 were to be smaller than the diameter of the end face 139, then the danger would exist that a paint deposit at the outer periphery of the end face 139 could prevent the cable shoe contacting this surface intimately.

The nut element can be embossed at positions such as 166 so that during the transport of the unit consisting of the bolt and nut element 110, 162 the nut element 162 is not lost.

A protection of this kind can also be achieved in other ways. For example the pitch of the thread of the nut element can be selected to be fractionally different than the pitch of the thread of the bolt element. It is however also sufficient to tighten the nut element firmly when the surfaces 160 and 139 lie in close contact with one another.

After the manufacture of the component assembly consisting of the sheet metal part 160, the bolt element 110 and the nut element 162 and optionally after installation of the component assembly into a vehicle body and subsequent painting the nut element is loosened and optionally unscrewed in order to firmly clamp a cable shoe or a plurality of cable shoes or a flange of a conductive housing or the like between the end face 160 of the nut element 162 and the end face 139 and to provide the required conductive transition from the bolt element 110 and from this to the sheet metal part 140. If desired a shaped projection with a special profile can be provided at the part 114 or at its end face 139 in order to prevent a rotation relative to the bolt element of a cable shoe having an opening of matching shape. On provision of such a projection the cable shoe is clamped between the end face 160 of the nut element and the end face of the projection, the shape of the projection and that of the opening of the cable shoe prevent mutual rotation of these components.

Although, with an earthing bolt, the end face 139 of the head part 112 should have a significant spacing from the top side of the sheet metal part, i.e. to the side of the sheet metal part which is remote from the rivet bead 150, this is not essential with other bolt elements. The end 139 can namely be significantly set back relative to the top side of the sheet metal part, i.e. lies significantly below the top side of the sheet metal, and indeed optionally by more than the sheet metal thickness, although this would not normally be desired. Normally the desired state would be such that the end face 139 lies flush with the upper side of the sheet metal part 140 around the conical recess, since this state favours the screwing on of a further component. The explanations given above likewise apply to the nut element of the FIGS. 1 and 3.

Since the bolt element of FIGS. 4 to 10 is introduced in self-piercing manner into the sheet metal part, using the method in accordance with the German patent 34 47 006, the rivet section 120 is beaded over after the piercing of the sheet metal part 140 by means of a corresponding shaping surface of the die that is used, so that it adopts the rounded shape 150 which is shown in FIG. 10. In this arrangement the sheet metal part is also deformed in the manner which can likewise be seen from FIG. 10. On piercing of the sheet metal part a piercing slug 160 arises which, as described in the above-named German patent, is firmly clamped within the cylindrical recess 132 in the rivet section 120, whereby, on the one hand, the problem of removing the piercing slug 160 is avoided and, on the other hand, an increase stiffness is achieved in the region of the head part 112. The conical recess 142 in the sheet metal part 140 arises during the punching out of the punching slug in the correspondingly shaped die, as can be read in the patent specification 34 47 006.

The sheet metal material 148 from the edge region of the pierced opening is here clampingly received in the beaded over rivet section 120. When the end face 139 of the head part 112 of the bolt element 110 is flush with the top side of the sheet metal part or is fractionally set back relative to the latter, then, on screwing on a further component which lies flat at the end face 139 and at the surrounding sheet metal a compressive stress is generated in the conical region 142 between the top side of the sheet metal part and the clamping recess for the edge region 148 of the pierced hole formed by the rivet section 120, optionally together with the "neck part" 118.

Although the design of the rivet section 120 of the bolt elements in accordance with FIGS. 4 to 10 has to be executed in correspondence with the rivet section of a SBF bolt or of an improved SF bolt (DE 10147076.2) this is not essential. One could for example design this region in accordance with the design of the rivet section 20 of the functional element of FIGS. 1 to 3 and attach the bolt element in accordance with FIGS. 4 to 10 to the sheet metal part 40 with the same process that was described in conjunction with FIGS. 1 to 3. The possibility likewise exists of providing the functional element in accordance with FIGS. 1 to 3 with a cylindrical rivet section in accordance with the rivet section 120 of the bolt element of FIGS. 4 to 10 and of attaching the nut element in the sheet metal part either in self-piercing manner or using a preceding hole punch in manner known per se.

The rounded end 138' of the noses 138 providing security against rotation ensure that the sheet metal part is not impermissibly cracked during the stamping in process, so that fatigue cracks in the sheet metal part at the positions of the noses providing security against rotation, i.e. at the positions of the radial projections 150' are not to be feared.

Although the bolt element 110 of FIGS. 4 to 10 is introduced in self-piercing manner the element can equally be inserted into a pre-holed component if this is desired.

An advantage of the functional element of the invention lies in the fact that with one element a broad range of sheet metal part thicknesses can be covered, so that for example the functional element of FIGS. 1 to 10 can be used with sheet metal parts with thicknesses in the range from 0.6 mm to 3 mm or indeed up to 4 mm. These thickness statements should not be understood restrictively and are also not restricted to the embodiments of FIGS. 1 to 10.

The functional elements described here can for example be made from all materials which achieve the strength class 5.6 or higher. Such metal materials are normally carbon steels with 0.15 to 0.55% carbon content.

In all embodiments all materials can be named as examples for the material of the functional elements which, in the context of cold deformation, achieve the strength values of class 8 in accordance with the Iso standard, for example a 35B2 alloy in accordance with DIN 1654. The so formed fastener elements are suitable amongst other things for all commercially available steel materials for sheet metal parts which are capable of being drawn and also for aluminium or its alloys. Aluminium alloys, in particular those with higher strength can be used for the functional elements, for example AlMg5. Functional elements of higher strength magnesium alloys such as for example AM50 also come into question.

The invention claimed is:

1. A component assembly comprising a fastener element in combination with a sheet metal panel having a thickness, said fastener element comprising a body part having first and second axial ends, said first axial end having a conical region with an at least substantially conical panel engaging surface, a generally cylindrical portion and a free end face, said conical region having a larger diameter end and a smaller diameter end, said generally cylindrical portion adjoining said larger diameter end and said free end face being provided at said generally cylindrical portion at an end thereof spaced from said conical region, said generally cylindrical portion being dimensioned to have a diameter at a position adjoining said larger diameter end that is no larger than said larger diameter end such that it does not form a ring flange at said larger diameter end, and said second axial end comprising a hollow cylindrical rivet section provided adjacent said smaller diameter end and having a cylindrical outer surface and an internal cylindrical bore with an internal diameter, said fastener element further comprising one of a threaded shaft protruding from said first axial end in a direction away from said cylindrical rivet section and a threaded bore extending within said first axial end and having a maximum thread diameter smaller than said internal diameter, said sheet metal panel having a conical boss with a conical recess having an internal conical surface contacting said conical surface of said fastener element at least substantially over a full area of said conical surface, said conical region has an axial length corresponding to at least approximately twice said sheet metal thickness and said conical boss having a rim at an aperture at a smaller diameter end of said conical boss, said rim being received in a ring recess formed in said cylindrical rivet section by radially outward deformation of said cylindrical rivet section.

2. A component assembly in accordance with claim 1, wherein features providing security against rotation are provided at said conical surface and sheet material of said sheet metal part in said conical recess engages in form-fitted manner with said features providing security against rotation.

3. A component assembly in accordance with claim 1, wherein said conical region has an axial length corresponding to at least four times said sheet metal thickness.

4. A component assembly in accordance with claim 1, wherein said conical surface of said conical region of said fastener and said conical surface of said conical recess have an included cone angle ($\alpha$) in the range between 60° and 150°.

5. A component assembly in accordance with claim 4, wherein said included cone angle ($\alpha$) amounts to approximately 90°.

6. A component assembly in accordance with claim 1, wherein said conical region merges via a cylindrical neck part into said cylindrical rivet section and said cylindrical neck part has an axial length which corresponds at least approximately to said sheet metal thickness.

7. A component assembly in accordance with claim 1, wherein said ring recess is defined at a radially outer side by displacement of material of said cylindrical rivet section (20).

8. A component assembly in accordance with claim 1, wherein said ring recess is formed by beading over of said cylindrical rivet section around a rim of an aperture formed by said smaller diameter end of said conical recess of said sheet metal part.

9. A component assembly in accordance with claim 1, wherein said fastener element is a bolt element having a shaft part with a thread which projects from said free end face, away from said larger diameter end of said conical region.

* * * * *